United States Patent
Boyd

(10) Patent No.: US 7,840,102 B2
(45) Date of Patent: Nov. 23, 2010

(54) DISTRIBUTED OPTICAL PRESSURE AND TEMPERATURE SENSORS

(75) Inventor: Clark Davis Boyd, Radford, VA (US)

(73) Assignee: Baker Hughes Incorporated, Houston, TX (US)

( * ) Notice: Subject to any disclaimer, the term of this patent is extended or adjusted under 35 U.S.C. 154(b) by 2 days.

(21) Appl. No.: 11/960,007

(22) Filed: Dec. 19, 2007

(65) Prior Publication Data

US 2009/0003759 A1    Jan. 1, 2009

Related U.S. Application Data

(60) Provisional application No. 60/885,048, filed on Jan. 16, 2007.

(51) Int. Cl.
*G02B 6/00* (2006.01)

(52) U.S. Cl. .......................... 385/13; 385/12

(58) Field of Classification Search ............ 385/12–13, 385/30
See application file for complete search history.

(56) References Cited

U.S. PATENT DOCUMENTS

| | | | |
|---|---|---|---|
| 4,659,923 A | 4/1987 | Hicks, Jr. | |
| 4,991,590 A * | 2/1991 | Shi | 600/480 |
| 5,390,546 A | 2/1995 | Wlodarczyk | |
| 5,399,854 A | 3/1995 | Dunphy et al. | |
| 5,438,873 A | 8/1995 | Wlodarczyk et al. | |
| 5,515,459 A | 5/1996 | Farhadiroushan | |
| 5,600,070 A | 2/1997 | Wlodarczyk | |
| 5,633,960 A | 5/1997 | Lagakos et al. | |
| 5,737,278 A | 4/1998 | Frederick et al. | |
| 5,805,753 A | 9/1998 | Lagakos et al. | |
| 5,841,131 A | 11/1998 | Schroeder et al. | |
| 6,016,702 A | 1/2000 | Maron | |

(Continued)

FOREIGN PATENT DOCUMENTS

JP    2003130934    5/2003

(Continued)

OTHER PUBLICATIONS

International Search Report and Written Opinion, Mailed Feb. 3, 2010, International Appln. No. PCT/US2009/049046, Written Opinion 5 Pages, International Search Report 4 Pages.

(Continued)

*Primary Examiner*—Charlie Peng
*Assistant Examiner*—Eric Wong
(74) *Attorney, Agent, or Firm*—Cantor Colburn LLP

(57) ABSTRACT

Disclosed herein is a carrier for an optical fiber having a plurality of optical sensors located thereon. Such carrier can be a thick-walled capillary tube or other shapes. The carrier has a sealed hollow body with a side wall. The side wall is profiled at least one predetermined location to form a thin-walled section and at least one optical sensor is attached to said thin-walled section. As the thin-walled section flexes in response to a pressure difference across it, the pressure difference is sensed by the optical sensor. The carrier may also have a slot defined on its side wall to receive the optical fiber. A temperature optical sensor may also be provided adjacent to the pressure optical sensor.

12 Claims, 1 Drawing Sheet

U.S. PATENT DOCUMENTS

| | | | |
|---|---|---|---|
| 6,018,390 A | 1/2000 | Youmans et al. | |
| 6,122,971 A | 9/2000 | Wlodarczyk | |
| 6,131,465 A | 10/2000 | Wlodarczyk et al. | |
| 6,218,661 B1 | 4/2001 | Schroeder et al. | |
| 6,233,374 B1 | 5/2001 | Ogle et al. | |
| 6,278,811 B1 | 8/2001 | Hay et al. | |
| 6,422,084 B1 | 7/2002 | Fernald et al. | |
| 6,452,667 B1 | 9/2002 | Fernald et al. | |
| 6,490,931 B1 | 12/2002 | Fernald et al. | |
| 6,668,656 B2 | 12/2003 | Fernald et al. | |
| 6,701,775 B1 | 3/2004 | Popielas et al. | |
| 6,738,145 B2 | 5/2004 | Sherrer et al. | |
| 6,820,488 B2 | 11/2004 | Lenzing et al. | |
| 6,823,738 B1 | 11/2004 | Wlodarczyk et al. | |
| 6,838,660 B2 | 1/2005 | Duncan et al. | |
| 6,898,339 B2 | 5/2005 | Shah et al. | |
| 6,945,117 B2 | 9/2005 | Boyd et al. | |
| 6,952,948 B2 | 10/2005 | Herbert et al. | |
| 6,998,599 B2 | 2/2006 | Lagakos et al. | |
| 7,000,698 B2 | 2/2006 | Mayeu et al. | |
| 7,020,354 B2 | 3/2006 | Lagakos et al. | |
| 7,062,140 B2 * | 6/2006 | Bjarklev et al. | 385/125 |
| 7,085,452 B1 * | 8/2006 | Lin et al. | 385/39 |
| 7,149,374 B2 | 12/2006 | Lagakos et al. | |
| 7,176,048 B1 | 2/2007 | Burns | |
| 7,196,318 B2 | 3/2007 | Shin et al. | |
| 7,282,698 B2 | 10/2007 | Childers | |
| 7,308,165 B2 | 12/2007 | Arias Vidal et al. | |
| 7,322,247 B2 | 1/2008 | Boyd et al. | |
| 7,340,118 B2 | 3/2008 | Wlodarczyk et al. | |
| 7,379,629 B1 | 5/2008 | Burns | |
| 7,443,509 B1 | 10/2008 | Burns | |
| 2001/0015276 A1 | 8/2001 | Pringle et al. | |
| 2002/0003917 A1 * | 1/2002 | Sherrer et al. | 385/12 |
| 2004/0114849 A1 | 6/2004 | Shah et al. | |
| 2004/0140092 A1 | 7/2004 | Robison | |
| 2004/0233458 A1 | 11/2004 | Frick | |
| 2004/0244502 A1 * | 12/2004 | Youngner et al. | 73/862.59 |
| 2005/0178206 A1 * | 8/2005 | Malmstrom et al. | 73/705 |
| 2007/0041019 A1 | 2/2007 | Schmidt | |
| 2007/0098323 A1 * | 5/2007 | Pi et al. | 385/30 |
| 2007/0151346 A1 * | 7/2007 | Malmstrom et al. | 73/705 |

FOREIGN PATENT DOCUMENTS

| | | |
|---|---|---|
| WO | 2005/024365 A2 | 3/2005 |
| WO | 2008031181 A1 | 3/2008 |

OTHER PUBLICATIONS

JP2002504663. "Fiber Optic Pressure Transducers and Pressure Sensing System Incorporating Same". Publication Date Feb. 12, 2002. Abstract Only.

E.P. Popov, "Mechanics of Materials", 2nd Ed., Prentice-Hall, 1976, pp. 288-292, 557-564.

Patents Act 1977: Examination Report Under Section 18(3). Application No. GB0912342.3. Mailed Feb. 1, 2010.

* cited by examiner

DISTRIBUTED OPTICAL PRESSURE AND TEMPERATURE SENSORS

CROSS REFERENCE TO RELATED APPLICATION

This application is a non-provisional application claiming priority to U.S. Provisional Patent Application No. 60/885,048 filed on Jan. 16, 2007. The parent application is incorporated by reference herein in its entirety.

BACKGROUND

The invention relates generally to optical fiber technologies. In particular, the invention relates to optical fiber that contains pressure and temperature sensors along its length.

Available electronic sensors measure a variety of values, such as, pH, color, temperature, or pressure, to name a few. For systems that require a string of electronic sensors over a long distance, e.g., twenty to thirty kilometers or longer, powering the electronic sensors becomes difficult. Conventionally, the powering of electronic sensors requires running electrical wire from a power source to each of the electronic sensors. Powering electronic sensors electrically has been unreliable in the petroleum and gas industry. For example, electric wires spanning long distances are subject to a significant amount of interference and noise, thereby reducing the accuracy of the electronic sensors.

Optical fibers have become the communication medium of choice for long distance communication due to their excellent light transmission characteristics over long distances and the ease of fabrication of lengths of many kilometers. Further, the light being transmitted can interrogate the sensors, thus obviating the need for lengthy electrical wires. This is particularly important in the petroleum and gas industry, where strings of electronic sensors are used in wells to monitor downhole conditions.

As a result, in the petroleum and gas industry, passive fiber optic sensors are used to obtain various downhole measurements, such as, pressure or temperature. A string of optical fibers within a fiber optic system is used to communicate information from wells being drilled, as well as from completed wells. The optical fiber could be deployed with single point pressure-temperature fiber optic sensor. Discrete optical fibers are fully disclosed in International Patent Application No. PCT/US 04/28625, entitled "Optical Sensor with Co-Located Pressure and Temperature Sensors." This application is incorporated herein by reference in its entirety.

Additionally, a series of weakly reflecting fiber Bragg gratings (FBGs) may be written into a length of optical fiber or a single Point Fabry-Perot sensor may be spliced into a length of optical fiber. An optical signal is transmitted down the fiber, which is reflected and/or scattered back to a receiver and analyzed to characterize external parameters along the length of the optical fiber. Using this information, downhole measurements including but not limited to temperature, pressure, and chemical environment may be obtained.

For weakly reflecting FBGs that are written into a length of optical fiber, there is no efficient system of carrying the FBGs and deploying these sensors downhole, and a need exists for such a system.

SUMMARY OF THE INVENTION

An aspect of the invention is directed toward a system to carry an optical fiber having a plurality of optical sensors written or otherwise located thereon. Such optical fibers may extend over long distances and may be deployed in oil and gas wells.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As illustrated in the accompanying drawings and discussed in detail below, the present invention is directed to optical sensors distributed along an optical fiber. In accordance with the present invention, a plurality of temperature/pressure sensors is formed on an optical fiber. While any type of optical sensors, such as intrinsic or extrinsic Fabry-Perot or Bragg gratings (FBGs) can be used, FBGs are preferred because they can be readily written on to the optical fiber. The optical fiber with optical sensors distributed thereon is preferably carried in the sidewall of a capillary tube. The optical sensor and capillary tube can extend over long distances, e.g., several kilometers or miles and can cover the entire depth of an oil and gas well. In a preferred embodiment, the capillary tube is a thick-walled metal capillary tube that is typically used to carry discrete pressure temperature optical sensor(s), such as an intrinsic Fabry-Perot sensor or an extrinsic Fabry-Perot sensor.

Figure 1:
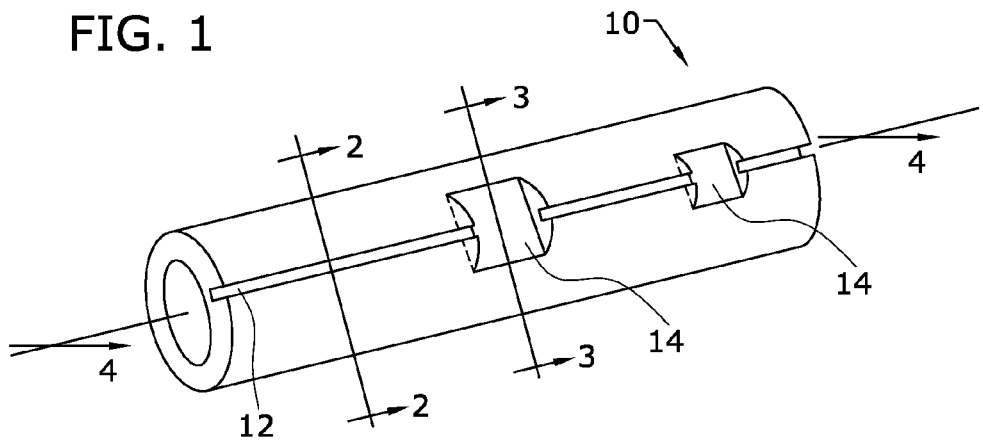
FIG. 1 is a schematic perspective view of distributed optical sensors being carried on a portion of a thick walled capillary tube according to the present invention with the optical fiber/sensors omitted for clarity.
Figure 2:
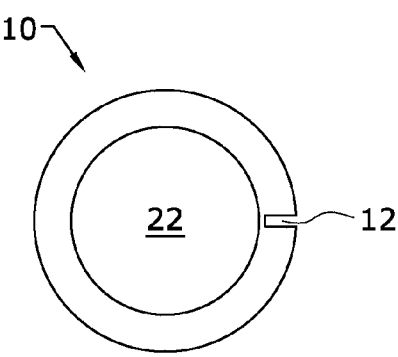
FIG. 2 is a cross-sectional view of the capillary tube along line 2-2 in FIG. 1.
Figure 3A:
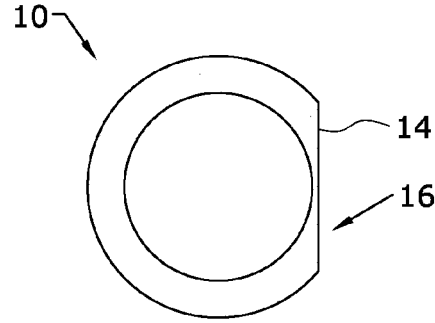
FIG. 3A is a cross-sectional view of the capillary tube along line 3-3 in FIG. 1.
Figure 3B:
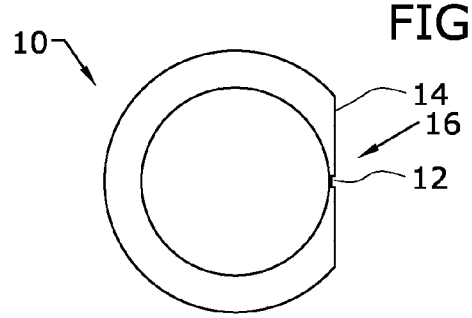
FIG. 3B is another embodiment of FIG. 3A.

Referring to FIG. 1, thick-walled metal capillary tube 10 is illustrated. Capillary tube 10 can be any length, and in one example tube 10 has an outer diameter of about 0.250 inch and an inner diameter of about 0.185 inch. Capillary tube of any thickness can be used, so long as the capillary tube has sufficient thickness to support the optical fiber and optical sensors. Tube 10 has a longitudinal slot 12 formed along its entire length. Slot 12 should have a width that is sufficient to carry therewithin an optical fiber with cladding(s), and is sufficiently small to have no significant impact on the structural integrity of capillary tube 12. Typically, slot 12 can be machined or cut-out from a conventional capillary tube, as shown in FIG. 2. Along the surface of tube 10 at predetermined locations, areas 14 are profiled. As best shown in FIGS. 3A and 3B, a portion of the side wall of tube 10 is machined away to form a thin-walled section 16, which acts as a diaphragm sensitive to pressure differential across it. Thin-walled section 16 may have a flat surface as shown in FIGS. 1 and 3A, or slot 12 may remain on the surface of thin-walled section 16, as shown in FIG. 3B. While only two profiled areas 14 are shown, any number of profiled areas 14 can be formed on tube 10. The spacing between adjacent profiled areas 14 can be selected, wherever pressure and temperature measurements are desired. In one example, the spacing can be a couple of centimeters and up.

Alternatively, slot 12 can be omitted and optical fiber 20 may be attached to capillary tube 10 is a serpentine fashion to absorb the thermal expansion/contraction of tube 10. The attachment can be continuous or at discrete spots.

Figure 4:
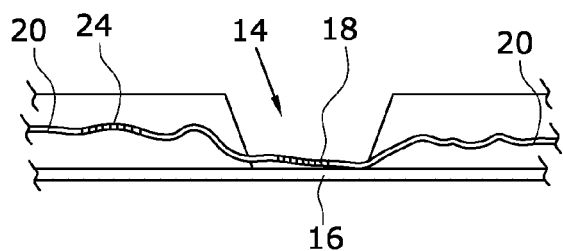
FIG. 4 is another cross-sectional view of the capillary tube in the longitudinal direction along line 4-4 in FIG. 1.

Within each profiled area 14, at least one optical sensor, e.g., FBG 18, is formed on optical fiber 20, as best shown in FIG. 4. FBG 18 is attached to thin-walled section 16, by any known methods, such as laser welding or by epoxies or adhesives, such that as thin-walled section 18 flexes or bends, FBG 18 also flexes or bends. FBG 18 can also be metallized, by vapor deposition of metal on the sensor or other known techniques. Interior space 22 is preferably sealed or otherwise rendered to hold a substantially constant reference pressure ($P_{ref}$) within. As the pressure to be measured outside of capillary tube 10 changes, the pressure difference flexes thin-walled section 16, which acts like a diaphragm. FBG 18 also flexes along with thin-walled section 16 and changes the frequency of the optical signal reflected from the FBG. A surface instrumentation unit (SIU) (not shown) receives the changed frequency and reads the pressure at the profiled area 14.

In an alternative embodiment, capillary tube 10 and interior space 22 are segmented into a plurality of sealed sections, for example, by walls or membranes orthogonal to the longitudinal axis of the capillary tube similar to that of a bamboo stalk. One or more optical sensors can be located on each segment. An advantage of segmenting the interior space 22 into sealed sections is that if interior space 22 is breached, i.e., exposed to well pressure, only the breached section is affected and the rest of the capillary tube remains sealed for the remaining optical sensors to function.

Between adjacent profiled areas 14, optical fiber 20 is preferably loosely overstuffed or placed within slot 12, as best shown in FIG. 4. The looseness of optical fiber 20 between profiled areas 14 allows slack to absorb thermal expansion and contraction of metal capillary tube 10, and allows the slack necessary to wound capillary tube 10 on to spools. The amount of slack can be determined from the coefficient of thermal expansion of the material of capillary tube 10 and/or the radii of the spools. Optionally, a second FBG 24 is provided proximate to FBG 18 to measure the changes in temperature. In other words, FBG 18 flexes with thin-walled section 16 to measure stress/strain and FBG 24 measures the temperature changes and to compensate for the temperature effect on FBG 18.

Since optical fiber 20 can extend for long distances, it is expected that a large number of optical fibers are written or otherwise located on the optical fiber. As such, it is preferred that advanced signal processing techniques are employed to distinguish reflected signals from the multiple optical sensors. Such advanced techniques are disclosed in commonly owned U.S. patent application Ser. No. 11/222,357, entitled "System and Method for Monitoring a Well" and filed on Sep. 8, 2005. The '357 patent application is incorporated herein by reference in its entirety. Among other things, the '357 application discloses a physical interleaving technique, where pluralities of sensors are disposed along the length of an optical fiber on each side of a reference reflector. In this technique, the corresponding sensors are placed at offset distances from the reflector to increase the sensing length. Additionally, physical interleaving technique can be expanded to combine multiple sensing lengths within one optical fiber to increase an overall sensing length. The '357 application also discusses combining multiple sensing length physical interleaving technique with wavelength division multiplexing (WDM), where each individual sensing length is designed to respond only to a wavelength that is slightly different from the next sensing length. This can further increase the sensing length by a function of the number of wavelength divisions that are present. Additionally, additional sensing length can be generated by using an aliasing technique, more specifically employing narrowband FBGs placed outside of the Nyquist sampling distance. Additional signal processing techniques are discussed in or cited within the '357 patent application.

While it is apparent that the illustrative embodiments of the invention disclosed herein fulfill the objectives of the present invention, it is appreciated that numerous modifications and other embodiments may be devised by those skilled in the art. For example, capillary tube 10 can be replaced by a carrier of another shape, such as spherical or cylindrical pressure vessels that have been profiled to form thin-walled sections thereon. Additionally, feature(s) and/or element(s) from any embodiment may be used singly or in combination with feature(s) and/or element(s) from other embodiment(s). Therefore, it will be understood that the appended claims are intended to cover all such modifications and embodiments, which would come within the spirit and scope of the present invention.

I claim:

1. A carrier for an optical fiber having a plurality of optical sensors located thereon, said carrier comprises:
    a sealed hollow body having a side wall, wherein the side wall is profiled at least one predetermined location to form a thin-walled section and wherein at least one optical sensor is directly attached to a surface of said thin-walled section, so that said thin-walled section flexes in response to a pressure difference across the thin-walled section and said pressure difference is sensed by said at least one optical sensor, wherein the sealed hollow body is a tube.

2. The carrier of claim 1, wherein the tube is a capillary tube.

3. The carrier of claim 1, wherein the sealed hollow body comprises a spherical or cylindrical pressure vessel.

4. The carrier of claim 1, wherein the side wall further comprises a slot defined thereon.

5. The carrier of claim 4, wherein the optical fiber is loosely disposed within said slot.

6. The carrier of claim 4, wherein the slot is defined on the thin-walled section.

7. The carrier of claim 1, wherein the optical fiber is attached to the surface of the hollow body.

8. The carrier of claim 7, wherein the optical fiber is attached to the surface of the hollow body in a serpentine fashion.

9. The cater of claim 8, wherein the optical fiber is attached intermittently to the surface of the hollow body.

10. The carrier of claim 1, wherein the optical fiber further comprises a temperature optical sensor proximate to the pressure optical sensor.

11. The carrier of claim 1, wherein the at least one pressure optical sensor is metallized.

12. The cater of claim 1 having an interior space, wherein said interior space is segmented into a plurality of sealed spaces.

* * * * *